United States Patent
Lu et al.

(10) Patent No.: US 12,328,192 B2
(45) Date of Patent: Jun. 10, 2025

(54) PARAMETER SETTING METHOD, PARAMETER INDICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Qianxi Lu, Dongguan (CN); Xin You, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 461 days.

(21) Appl. No.: 17/833,999

(22) Filed: Jun. 7, 2022

(65) Prior Publication Data
US 2022/0303061 A1    Sep. 22, 2022

Related U.S. Application Data

(63) Continuation of application No. PCT/CN2019/128901, filed on Dec. 26, 2019.

(51) Int. Cl.
*H04L 1/1812* (2023.01)
*H04L 1/1829* (2023.01)
*H04L 1/1867* (2023.01)

(52) U.S. Cl.
CPC .......... *H04L 1/1812* (2013.01); *H04L 1/1848* (2013.01); *H04L 1/188* (2013.01)

(58) Field of Classification Search
None
See application file for complete search history.

(56) References Cited

U.S. PATENT DOCUMENTS

2016/0174207 A1* 6/2016 Belleschi .......... H04W 52/0216
                                                      455/450
2019/0045550 A1* 2/2019 Jang .................. H04W 72/0453
(Continued)

FOREIGN PATENT DOCUMENTS

| CN | 101388756 A | 3/2009 |
| CN | 108365924 A | 8/2018 |

(Continued)

OTHER PUBLICATIONS

ETSI TS 138.321 version 15.5.0 ; "5G; NR; Medium Access Control (MAC) protocol specification", May 2019; p. 11-45.*
(Continued)

*Primary Examiner* — Ayman A Abaza
*Assistant Examiner* — Camquyen Thai
(74) *Attorney, Agent, or Firm* — PERKINS COIE LLP

(57) ABSTRACT

The present application relates to a parameter setting method, a parameter indication method, a terminal device, and a network device, capable of setting appropriate parameters for a resource. The parameter setting method comprises: a terminal device receives a parameter indication, the parameter indication being used for setting the parameters of a resource to a first value or a second value; on the basis of the parameter indication, the terminal device sets the parameters of a first resource to the first value or the second value, the first resource being the resource in the parameter indication.

17 Claims, 6 Drawing Sheets

200

S210 — A terminal device receives a parameter indication that is used for setting a parameter of a resource to a first value or a second value S220 — The terminal device sets a parameter of a first resource to the first value or the second value according to the parameter indication; wherein the first resource is a resource in the parameter indication

(56) References Cited

U.S. PATENT DOCUMENTS

| | | | |
|---|---|---|---|
| 2019/0363843 A1 | 11/2019 | Gordaychik | |
| 2019/0379433 A1 | 12/2019 | Chen et al. | |
| 2020/0084592 A1* | 3/2020 | Gulati | H04W 72/0466 |
| 2021/0105746 A1* | 4/2021 | Sarkis | H04W 72/04 |
| 2022/0286235 A1* | 9/2022 | Ranta-Aho | H04L 1/1887 |

FOREIGN PATENT DOCUMENTS

| | | | |
|---|---|---|---|
| CN | 110301143 A | 10/2019 | |
| CN | 110351865 A | 10/2019 | |
| CN | 110447281 A | 11/2019 | |
| CN | 110495232 A | 11/2019 | |
| CN | 110572236 A | 12/2019 | |
| EP | 3550754 A1 | 10/2019 | |
| GB | 2585857 A | 1/2021 | |
| WO | 2018201982 A1 | 4/2018 | |
| WO | 2018137621 A1 | 8/2018 | |
| WO | 2018144433 A1 | 8/2019 | |
| WO | 2019160737 A1 | 8/2019 | |
| WO | 2019195446 A1 | 10/2019 | |

OTHER PUBLICATIONS

Notice of Grant of the Chinese application No. 2022109533684, issued on Jan. 2, 2024. 10 pages with English translation.

Oppo, R2-1915167 "Discussion on DRX operation in NTN". 3GPP TSG-RAN WG2 Meeting #108, Reno, USA, Nov. 18-Nov. 22, 2019. 7 pages.

Oppo, R2-1913336 "Discussion on DRX operation in NTN". 3GPP TSG-RAN WG2 Meeting #107bis, Chongqing, China, Oct. 14-Oct. 18, 2019. 5 pages.

CMCC, Huawei, HiSilicon, Sony, KT Corp, R2-1913173 "Further consideration on HARQ configuration in NTN". 3GPP TSG-RAN WG2 Meeting 107bis, Chongqing, Oct.14-18, 2019. 5 pages.

Catt, R1-1912166 "Further consideration on HARQ operation". 3GPP TSG RAN WG1 Meeting #99, Reno, USA, Nov. 18-22, 2019. 2 pages.

International Search Report Mailed Sep. 29, 2020 In International Application No. PCT/CN2019/128901.

Huawei, Qualcomm Europe, Correction to UL HARQ Process for the transmission of Msg3, 3GPP TSG-RAN WG2 Meeting #63bis, R2-085947, Sep. 19-Oct. 3, Prague, Czech Republic, 3 pages.

LG Electronics, New WID on NR sidelink enhancement, 3GPP TSG RAN Meeting #86, RP-193231, Sitges, Spain, Dec. 9-12, 2019, 6 pages.

Ericsson et al. "DRX adaptions for NTN" Tdoc R2-1915566; 3GPP TSG RAN WG2 #108; Reno, Nevada, USA; Nov. 18-22, 2019. 11 pages.

Extended European Search Report for European Application No. 19957208.2 issued Sep. 30, 2022. 10 pages.

Huawei et al. "Discussion on HARQ for NTN" R1-1911861; 3GPP TSG RAN WG1 Meeting #99; Reno, USA; Nov. 18-22, 2019. 4 pages.

MediaTek Inc. "Summary of 7.2.5.4 on more delay-tolerant re-transmission mechanisms in NR-NTN" R1-1913369; 3GPP TSG RAN WG1 Meeting #99; Reno, USA; Nov. 18-22, 2019. 15 pages.

Examination Report of the EP application No. 19957208.2, issued on Oct. 19, 2023. 6pages.

CMCC, Huawei et al., R2-1914197 "Further consideration on HARQ configuration in NTN". 3GPP TSG-RAN WG2 Meeting 107bis. Chongqing, , Oct. 14-18, 2019. 5pages.

Huawei, HiSilicon ,R1-1910065 "Discussion on HARQ for NTN". 3GPP TSG RAN WG1 Meeting #98bis. Chongqing, China, Oct. 14-20, 2019. 4pages.

Second Office Action of the Chinese application No. 202210953368. 4, issued on Sep. 20, 2023. 16 pages with English translation.

Examination Report of the EP application No. 19957208.2, issued on May 11, 2023. 5 pages.

OPPO,R1-1910386 "NTN control procedure for physical layer". 3GPP TSG RAN WG1 #98bis Chongqing, China, Oct. 14-20, 2019. 3 pages.

OPPO,R1-1910388 "Delay-tolerant HARQ operation for NTN". 3GPP TSG RAN WG1 #98bis Chongqing, China, Oct. 14-20, 2019. 3 pages.

First Office Action of the Chinese application No. 202210953368.4, issued on Jun. 29, 2023. 17 pages with English translation.

* cited by examiner

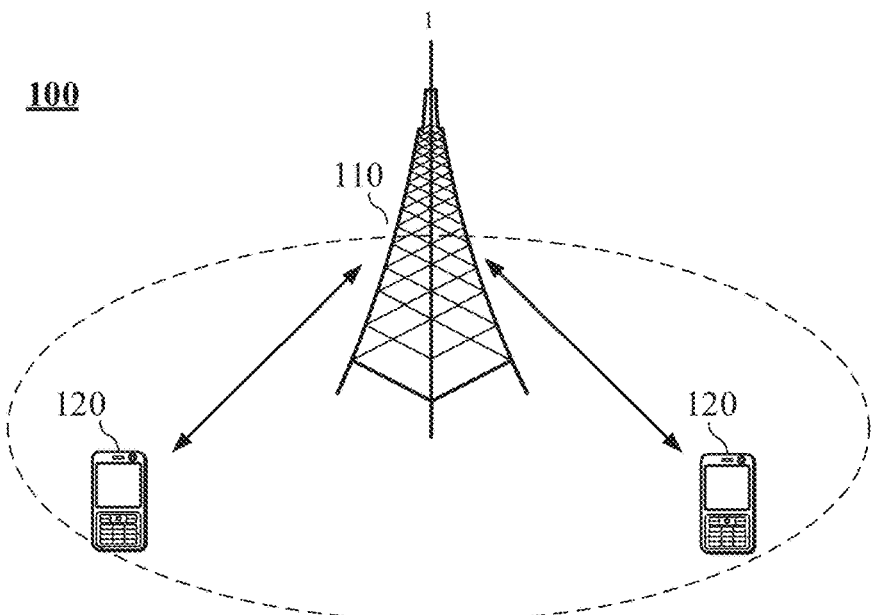
FIG. 1
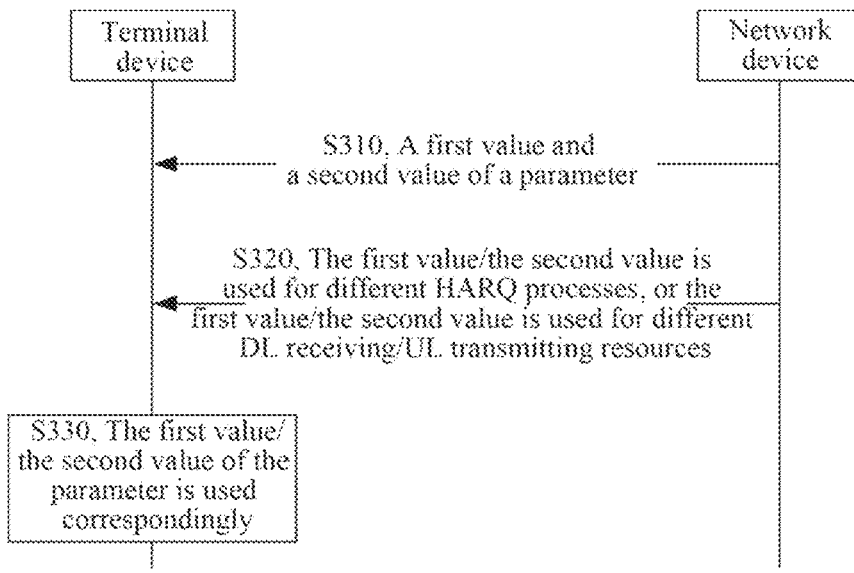
FIG. 2
FIG. 3

PARAMETER SETTING METHOD, PARAMETER INDICATION METHOD, TERMINAL DEVICE, AND NETWORK DEVICE

CROSS-REFERENCE TO RELATED APPLICATION

This application is a continuation application of International Application No. PCT/CN2019/128901, filed on Dec. 26, 2019, the entire disclosure of which is hereby incorporated by reference.

TECHNICAL FIELD

The present application relates to the field of communication, and more particularly to a parameter setting method, a parameter indication method, a terminal device, and a network device.

BACKGROUND

There may be different feedback types in Hybrid Automatic Repeat reQuest (HARQ) technologies, for example, feedback-based HARQ transmission and non-feedback-based HARQ transmission. For some communication systems with long transmission delay, e.g., a Non-Terrestrial Network (NTN) system, considering Quality of Service (QoS) requirements of different services, feedback-based HARQ transmission or non-feedback-based HARQ transmission may be used respectively. At present, there is no way to set an appropriate parameter for a resource yet.

SUMMARY

Implementations of the present application provide a parameter setting method, a parameter indication method, a terminal device, and a network device, thus corresponding HARQ transmission related parameters may be used for different HARQ feedback types.

An implementation of the present application provides a parameter setting method, including: receiving, by a terminal device, a parameter indication that is used for setting a parameter of a resource to a first value or a second value; and setting, by the terminal device, a parameter of a first resource to the first value or the second value according to the parameter indication.

An implementation of the present application proposes a parameter indication method, including: sending, by a network device, a parameter indication that is used for setting a parameter of a resource to a first value or a second value.

An implementation of the present application proposes a terminal device, including: a receiving module, configured to receive a parameter indication that is used for setting a parameter of a resource to a first value or a second value; and a parameter setting module, configured to set a parameter of a first resource to the first value or the second value according to the parameter indication.

An implementation of the present application provides a network device, which includes a processor and a memory. The memory is configured to store a computer program, and the processor is configured to invoke and run the computer program stored in the memory to perform the method performed by the network device in the above parameter indication method.

An implementation of the present application provides a chip, which is configured to implement the above parameter setting method.

Specifically, the chip includes a processor configured to invoke and run a computer program from a memory, to enable a device having the chip installed therein to perform the above parameter setting method.

An implementation of the present application provides a chip, which is configured to perform the above parameter indication method.

Specifically, the chip includes a processor configured to invoke and run a computer program from a memory, to enable a device having the chip installed therein to perform the above parameter indication method.

An implementation of the present application provides a computer-readable storage medium configured to store a computer program, and the computer program enables a computer to perform the above parameter setting method.

An implementation of the present application provides a computer-readable storage medium configured to store a computer program, and the computer program enables a computer to perform the above parameter indication method.

An implementation of the present application provides a computer program product, which includes computer program instructions, wherein the program instructions enable a computer to perform the above parameter setting method.

An implementation of the present application provides a computer program product, which includes computer program instructions, wherein the program instructions enable a computer to perform the above parameter indication method.

An implementation of the present application provides a computer program that, when running on a computer, enables the computer to perform the above parameter setting method.

An implementation of the present application provides a computer program, when running on a computer, enables the computer to perform the above parameter indication method.

In an implementation of the present application, a terminal device receives a parameter indication and sets a parameter of a first resource to a first value or a second value according to the parameter indication, so as to achieve setting an appropriate parameter for a resource. Furthermore, a network device may instruct the terminal device to set the appropriate parameter for the resource by sending the parameter indication to the terminal device.

BRIEF DESCRIPTION OF DRAWINGS

FIG. 1 is a schematic diagram of an application scenario according to an implementation of the present application.

FIG. 2 is a schematic flowchart of a parameter setting method according to an implementation of the present application.

FIG. 3 is a schematic flowchart according to a first implementation of the present application.

DETAILED DESCRIPTION

Figure 4:
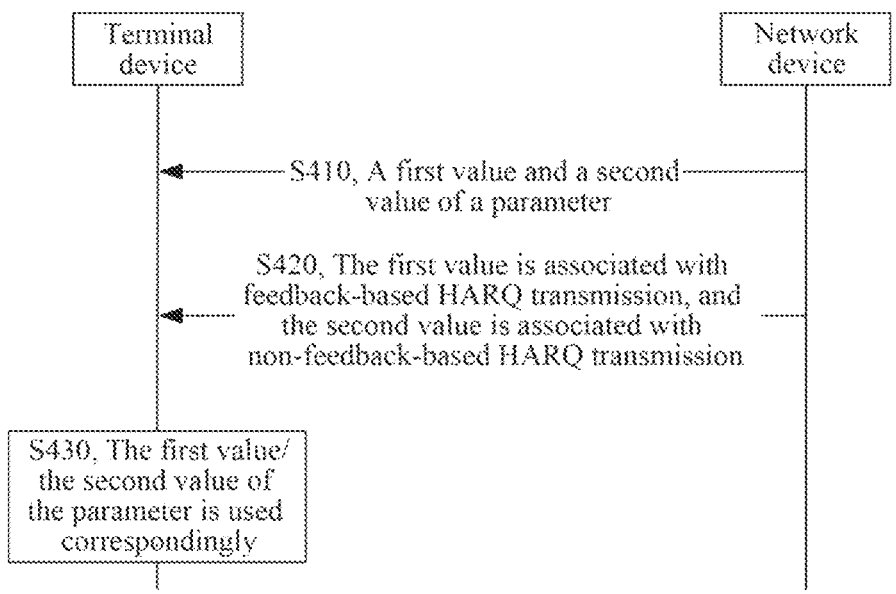
FIG. 4 is a schematic flowchart according to a second implementation of the present application.

Technical solutions in the implementations of the present application will be described below in combination with accompanying drawings in the implementations of the present application.

The technical solutions of the implementations of the present application may be applied to various communication systems, e.g., a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolution system of an NR system, an LTE-based access to unlicensed spectrum (LTE-U) system, an NR-based access to unlicensed spectrum (NR-U) system, a Universal Mobile Telecommunications System (UMTS), Wireless Local Area Networks (WLAN), Wireless Fidelity (WiFi), a next generation communication (5th-Generation (5G)) system, or another communication system.

Generally speaking, traditional communication systems support a limited quantity of connections, and are easy to implement. However, with development of communication technologies, mobile communication systems will not only support traditional communication, but also support, for example, Device to Device (D2D) communication, Machine to Machine (M2M) communication, Machine Type Communication (MTC), and Vehicle to Vehicle (V2V) communication, and the implementations of the present application may also be applied to these communication systems.

Optionally, a communication system in the implementations of the present application may be applied to a Carrier Aggregation (CA) scenario, or a Dual Connectivity (DC) scenario, or a Standalone (SA) network deployment scenario.

A frequency spectrum to which an implementation of the present application is applied is not limited. For example, the implementation of the present application may be applied to a licensed spectrum, or an unlicensed spectrum.

Various implementations of the present application are described in combination with the network device and the terminal device, wherein the terminal device may also be referred to as a User Equipment (UE), an access terminal, a subscriber unit, a subscriber station, a mobile station, a mobile platform, a remote terminal, a mobile device, a user terminal, a terminal, a wireless communication device, a user agent, or a user apparatus, etc. The terminal device may be a STATION (ST) in the WLAN, and may be a cellular phone, a cordless phone, a Session Initiation Protocol (SIP) phone, a Wireless Local Loop (WLL) station, a Personal Digital Assistant (PDA) device, a handheld device with a wireless communication function, a computing device, or another processing device connected to a wireless modem, a vehicle-mounted device, a wearable device, or a next generation communication system, e.g., a terminal device in an NR network or a terminal device in a future evolved Public Land Mobile Network (PLMN).

As an example but not a limitation, in the implementations of the present application, the terminal device may also be a wearable device. The wearable device may also be referred to as a wearable smart device, which is a general term of wearable devices, e.g., glasses, gloves, a watch, clothing, or shoes, which are intelligent designed for daily wear and developed by using wearing technologies. The wearable device is a portable device that is worn directly on a body, or integrated into clothes or an accessory of a user. The wearable device is not only a hardware device, but also achieves powerful functions through software support, data interaction, and cloud interaction. Generalized wearable smart devices include a device that is full functioned, large sized, and may achieve complete or partial functions without relying on a smart phone, such as a smart watch, or smart glasses, and include a device that only focuses on a kind of application function, and needs to be used in conjunction with another device such as a smart phone, such as various types of smart bracelets, smart jewelry, or the like, for monitoring physical signs.

The network device may be a device configured to communicate with a mobile device, and may be an Access Point (AP) in WLAN, or a Base Transceiver Station (BTS) in GSM or CDMA, or may be a NodeB (NB) in WCDMA, or an Evolutional Node B (eNB or eNodeB) in LTE, or a relay station or an access point, or a vehicle-mounted device, a wearable device, a network device (gNB) in an NR network, or a network device in a future evolved PLMN network, etc.

In an implementation of the present application, a network device provides a service for a cell, and a terminal device communicates with the network device through a transmission resource (e.g., a frequency domain resource, or called a spectrum resource) used for the cell, wherein the cell may be a cell corresponding to the network device (e.g., a base station), the cell may belong to a macro base station, or a base station corresponding to a Small cell. The Small cell here may include: a Metro cell, a Micro cell, a Pico cell, or a Femto cell, etc. These Small cells have characteristics of a small coverage range and a low transmission power, and are suitable for providing high-speed data transmission services.

FIG. 1 exemplarily illustrates one network device 110 and two terminal devices 120. Optionally, a wireless communication system 100 may include a plurality of network devices 110, and another quantity of terminal devices may be included within a coverage range of each network device 110, which is not limited in the implementations of the present application.

Optionally, the wireless communication system 100 may further include another network entity such as a Mobility Management Entity (MME) and an Access and Mobility Management Function (AMF), which is not limited in the implementations of the present application.

It should be understood that the terms "system" and "network" are often used interchangeably herein. The term "and/or" herein refers to an association relationship describing associated objects only, which indicates that three kinds of relationships may exist, for example, A and/or B may indicate three cases: A alone, both A and B at the same time, and B alone. In addition, the symbol "/" herein generally indicates that objects before and after the symbol "/" have an "or" relationship.

FIG. 2 is a schematic flowchart of a parameter setting method 200 according to an implementation of the present application. The method may optionally be applied to the system shown in FIG. 1, but is not limited thereto. The method includes at least portion of following contents.

In S210, a terminal device receives a parameter indication that is used for setting a parameter of a resource to a first value or a second value.

In S220, the terminal device sets a parameter of a first resource to the first value or the second value according to the parameter indication; wherein the first resource is a resource in the parameter indication.

In an implementation of the present application, this resource may refer to a Hybrid Automatic Repeat reQuest (HARQ) process, or a DownLink (DL) receiving/UpLink (UL) transmitting resource in a HARQ process. The parameter may include at least one of following: a Modulation Coding Scheme (MCS) table, repetition times of data transmission, and a parameter of a first timer. The first timer may include at least one of following: a Discontinuous Reception (DRX) DownLink (DL) HARQ Round Trip Time (RTT) Timer (DRX-HARQ-RTT-Timer DL); a Discontinuous Reception UpLink (UL) HARQ RTT Timer (DRX-HARQ-RTT-TimerUL); a Discontinuous Reception UpLink Retransmission Timer (DRX-RetransmissionTimerUL); a Discontinuous Reception DownLink Retransmission Timer (DRX-RetransmissionTimerDL); and a Configured Grant Timer.

In an implementation, a network device may pre-configure specific values of the first value and/or the second value of the parameter; furthermore, for different resources, HARQ feedback types adopted for the resources may be configured.

In one implementation, the above-mentioned HARQ feedback types include feedback-based HARQ transmission and non-feedback-based HARQ transmission.

For example, for different HARQ processes, the HARQ process is configured to perform feedback-based HARQ transmission or non-feedback-based HARQ transmission.

For another example, for different DL receiving/UL transmitting resources, the DL receiving/UL transmitting resources are configured to perform feedback-based HARQ transmission or non-feedback-based HARQ transmission.

Accordingly, a network device may transmit a parameter indication to a terminal device to instruct the terminal device to set a parameter of a resource to a first value or a second value, thereby achieving different values of the parameter are associated with different HARQ feedback types.

Specifically, in an implementation of the present application, at least following two modes may be used for parameter indication.

In a first mode, for different resources, the parameter indication indicates parameters of the resources are set to a first value or a second value.

For example, for different HARQ processes, it is indicated that a first value or a second value is used for parameters of the HARQ processes.

Or, for different DL receiving/UL transmitting resources, it is indicated that a first value or a second value is used for parameters of the DL receiving/UL transmitting resources.

In a second mode, for different HARQ feedback types, the parameter indication is also used for indicating that a first HARQ feedback type of a resource is associated with a first value of a parameter, and/or that a second HARQ feedback type of a resource is associated with a second value of a parameter.

For example, the parameter indication is used for indicating that a first value is associated with feedback-based HARQ transmission, and that a second value is associated with non-feedback-based HARQ transmission.

Corresponding to the above-mentioned first parameter indication mode, a terminal device in an implementation of the present application may directly set a parameter of a resource to a first value or a second value according to the parameter indication, thereby achieving that different values of the parameter are associated with different HARQ feedback types.

Corresponding to the above-mentioned second parameter indication mode, a terminal device in an implementation of the present application may determine by itself, to set a parameter of a resource to a first value or a second value according to a preliminary configuration and the parameter indication, thereby achieving different values of the parameter are associated with different HARQ feedback types. Specifically, the act S220 may include: the terminal device determines a HARQ feedback type of a first resource according to an identity of the first resource; and the terminal device sets a parameter of the first resource to the first value or the second value according to the HARQ feedback type of the first resource and the parameter indication.

The identity of the first resource may refer to identification information that may uniquely determine the first resource. The network device may pre-configure HARQ feedback types of different resources.

For example, according to an identity of a first resource, a UE determines that a HARQ feedback type of the first resource is feedback-based HARQ transmission; then, according to a parameter indication, a parameter of the first resource of the feedback-based HARQ transmission is set to a first value. Or, according to an identity of a first resource, a UE determines that a HARQ feedback type of the first resource is non-feedback-based HARQ transmission; then, according to a parameter indication, a parameter of the first resource of the non-feedback-based HARQ transmission is set to a second value. In this way, it is achieved that different values of a parameter are associated with different HARQ feedback types.

When the above-mentioned parameter is a parameter of a first timer, the terminal device may further set the first timer with a first value to start or not start, and/or set the first timer with a second value to start or not start according to a configuration or an indication of the network device.

In one implementation, the network device may configure whether to start a first timer with a first value and/or whether to start a first timer with a second value. The terminal device may set a starting condition of the first timer of a resource according to the aforementioned configuration.

In another implementation, the parameter indication may be further used for indicating whether to start a first timer with a first value and/or whether to start a first timer with a second value. The terminal device may set a starting condition of the first timer according to the parameter indication.

For example, it may be configured or indicated to start a first timer with a first value, and/or configured or indicated not to start a first timer with a second value. In an implementation of the present application, a default state of a first timer may be set to a starting state. Accordingly, when a starting condition of the first timer is indicated, if the first timer needs to be started, no explicit indication is needed; if the first timer needs not to be started, an explicit indication may be performed.

Optionally, the above-mentioned parameter indication is used for setting a parameter of a HARQ process to a first value or a second value.

Optionally, the above-mentioned parameter indication is further used for indicating that a parameter of a HARQ process of a feedback-based HARQ transmission type is set to a first value, and/or a parameter of a HARQ process of a non-feedback-based HARQ transmission type is set to a second value.

Optionally, the terminal device sets the parameter of the first resource to the first value or the second value according to the parameter indication, including: the terminal device determines a HARQ feedback type of a HARQ process according to an identity of the HARQ process; the terminal device sets a parameter of the HARQ process to the first value when it is determined that the HARQ process is a HARQ process of a feedback-based HARQ transmission type; or, the terminal device sets a parameter of the HARQ process to the second value when it is determined that the HARQ process is a HARQ process of a non-feedback-based HARQ transmission type.

Optionally, the above-mentioned parameter indication is used for setting a parameter of a DL receiving/UL transmitting resource in the HARQ process to the first value or the second value.

Optionally, the above-mentioned parameter indication is further used for indicating that a parameter of a DL receiving/UL transmitting resource of the feedback-based HARQ transmission type is set to the first value, and/or a parameter of a DL receiving/UL transmitting resource of the non-feedback-based HARQ transmission type is set to the second value.

Optionally, the terminal device sets the parameter of the first resource to the first value or the second value according to the parameter indication, including:

determining, by the terminal device, a HARQ feedback type of a DL receiving/UL transmitting resource according to an identity of the DL receiving/UL transmitting resource; and, setting a parameter of the DL receiving/UL transmitting resource to the first value when it is determined that the DL receiving/UL transmitting resource is a DL receiving/UL transmitting resource of a feedback-based HARQ transmission type; or, setting a parameter of the DL receiving/UL transmitting resource to the second value when it is determined that the DL receiving/UL transmitting resource is a DL receiving/UL transmitting resource of a non-feedback-based HARQ transmission type.

Optionally, the above-mentioned parameter indication is further used for indicating that a parameter of a first timer of a HARQ process used for a DL receiving/UL transmitting resource of a feedback-based HARQ transmission type is set to the first value, and/or a parameter of a first timer of a HARQ process used for a DL receiving/UL transmitting resource of a non-feedback-based HARQ transmission type is set to the second value.

Optionally, the terminal device sets the parameter of the first resource to the first value or the second value according to the parameter indication, including: determining, by the terminal device, a HARQ feedback type of a DL receiving/UL transmitting resource according to an identity of the DL receiving/UL transmitting resource; and, setting a parameter of a first timer of a HARQ process used for the DL receiving/UL transmitting resource to a first value when it is determined that the DL receiving/UL transmitting resource is a DL receiving/UL transmitting resource of a feedback-based HARQ transmission type; or, setting a parameter of a first timer of a HARQ process used for the DL receiving/UL transmitting resource to a second value when it is determined that the DL receiving/UL transmitting resource is a DL receiving/UL transmitting resource of a non-feedback-based HARQ transmission type.

Optionally, the parameter indication is transmitted in a Radio Resource Control (RRC) signaling, a Medium Access Control (MAC) Control Element (CE), or Downlink Control Information (DCI).

The parameter setting method of the implementation of the present application implementation is introduced by using specific implementations as follows.

A First Implementation

FIG. 3 is a schematic flowchart according to a first implementation of the present application, which includes following acts.

In act S310, a network device configures a first value and a second value of a parameter.

The parameter includes, but is not limited to, an MSC table used for data transmission, repetition times used for data transmission, etc. For example, for the MSC table, a first value of the MSC table may be configured to be mainly aimed at lower modulation and demodulation modes, and a second value to include higher modulation and demodulation modes. For another example, for the repetition times used for data transmission, a first value of the repetition times may be configured to be 1, and a second value to be 2 or 4, etc.

At the same time, the network device configures relevant parameters for HARQ feedback.

For example, for different HARQ processes, feedback-based HARQ transmission or non-feedback-based HARQ transmission is performed; or, feedback-based HARQ transmission or non-feedback-based HARQ transmission is performed for different DL receiving/UL transmitting resources.

In act S320, the network device further indicates that the first value or the second value is used for feedback-based HARQ transmission or non-feedback-based HARQ transmission.

For example, for different HARQ processes, it is indicated in a Radio Resource Control (RRC) signaling or a Medium Access Control (MAC) Control Element (CE) to use the first value or the second value.

Or, for different DL receiving/UL transmitting resources, it is indicated in an RRC signaling or Downlink Control Information (DCI) to use the first value or the second value.

In act S330, a UE determines to use the first value or the second value according to an indication of the act S320. Furthermore, the UE determines a specific value of the first value or the second value used according to a configuration of the act S310.

For example, for different HARQ processes, the first value or the second value is used correspondingly.

Specifically, for example, the UE determines that a first value or a second value is used for a HARQ process where the UE is currently located according to the HARQ process where the UE is currently located and the indication of the act S320. Furthermore, the UE determines a specific value of the first value or the second value used according to the configuration of the act S310.

For another example, the first value or the second value is used for different DL receiving/UL transmitting resources correspondingly.

Specifically, for example, according to a DL receiving/UL transmitting resource where the UE is currently located and the indication of the act S320, the UE determines that a first value or a second value is used for the DL receiving/UL transmitting resource where the UE is currently located. Furthermore, the UE determines a specific value of the first value or the second value used according to the configuration of act S310.

A Second Implementation

FIG. 4 is a schematic flowchart according to a second implementation of the present application, which includes following acts.

In act S410, a network configures a first value and a second value of a parameter.

The parameter includes, but is not limited to, an MCS table used for data transmission and repetition times of data transmission, etc.

At the same time, the network configures relevant parameters for HARQ feedback.

For example, for different HARQ processes, feedback-based HARQ transmission or non-feedback-based HARQ transmission is performed; or, feedback-based HARQ transmission or non-feedback-based HARQ transmission is performed for different DL receiving/UL transmitting resources.

In act S420, the network further indicates that the first value or the second value is used for feedback-based HARQ transmission or non-feedback-based HARQ transmission.

For example, it is indicated that the first value is associated with feedback-based HARQ transmission, and indicated that the second value is associated with non-feedback-based HARQ transmission.

In act S430, according to a configuration of HARQ feedback and an indication in act S420, a UE determines by itself, to use the first value or the second value. Furthermore, the UE determines a specific value of the first value or the second value used according to a configuration of the act S410.

For example, for different HARQ processes, the first value or the second value is used correspondingly.

Specifically, for example, according to a HARQ process where the UE is currently located and the configuration of the act S410, the UE determines that feedback-based HARQ transmission or non-feedback-based HARQ transmission is performed in the HARQ process where the UE is currently located; then, according to the indication of the act S420, the UE determines that the first value or the second value is used for the HARQ process where the UE is currently located. Furthermore, the UE determines a specific value of the first value or the second value used according to the configuration of the act S410.

For another example, the first value or the second value is used for different DL receiving/UL transmitting resources correspondingly.

Specifically, for example, according to a DL receiving/UL transmitting resource where the UE is currently located and the configuration of the act S410, the UE determines that the DL receiving/UL transmitting resource where the UE is currently located is used for feedback-based HARQ transmission or non-feedback-based HARQ transmission; then, according to the indication of the act S420, the UE determines that the first value or the second value is used for the DL receiving/UL transmitting resource where the UE is currently located. Furthermore, the UE determines a specific value of the first value or the second value used according to the configuration of the act S410.

A Third Implementation

Figure 5:
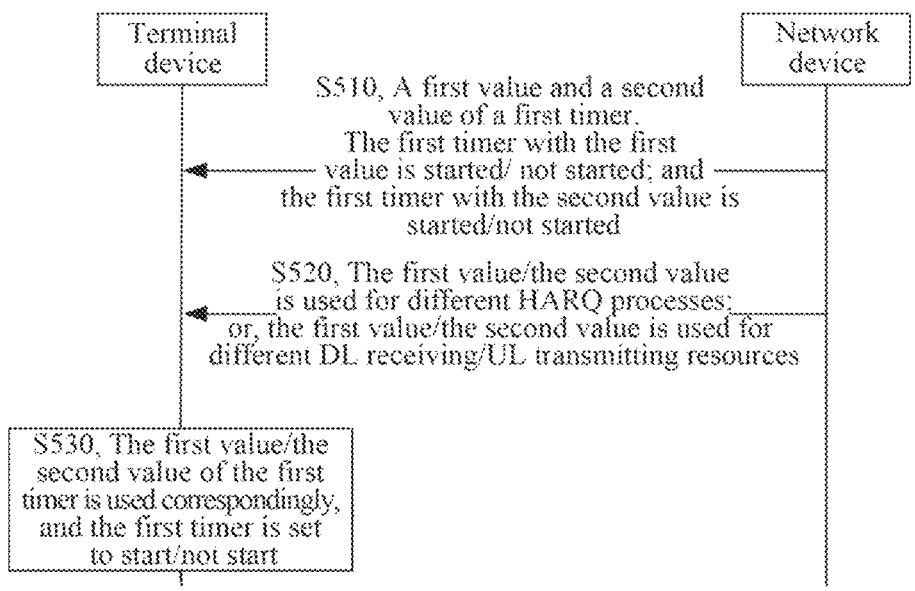
FIG. 5 is a schematic flowchart according to a third implementation of the present application.

FIG. 5 is a schematic flowchart according to a third implementation of the present application, which includes following acts.

In act S510, a network device configures a first value and a second parameter of a first timer; and configures whether to start the first timer with the first value, and/or whether to start the first timer with a second value.

Optionally, the parameter of the first timer may be used as a parameter, and the first timer includes one or more of following timers: a) a Discontinuous Reception DownLink HARQ RTT Timer (DRX-HARQ-RTT-TimerDL); b) a Discontinuous Reception UpLink HARQ RTT Timer (DRX-HARQ-RTT-TimerUL); c) a Discontinuous Reception UpLink Retransmission Timer (DRX-RetransmissionTimerUL); d) a Discontinuous Reception DownLink Retransmission Timer (DRX-RetransmissionTimerDL); and e) a Configured Grant Timer.

The parameter of the first timer may be set to different time lengths. For example, a first value of the parameter of the first timer is set to a time length of t1, and a second value of the parameter of the first timer is set to a time length of t2.

At the same time, the network configures relevant parameters for HARQ feedback.

For example, for different HARQ processes, feedback-based HARQ transmission or non-feedback-based HARQ transmission is performed; or, feedback-based HARQ transmission or non-feedback-based HARQ transmission is performed for different DL receiving/UL transmitting resources.

In act S520, the network device further indicates that the first value or the second value is used for feedback-based HARQ transmission or non-feedback-based HARQ transmission.

For example, for different HARQ processes, it is indicated in an RRC signaling or a MAC CE that the first value or the second value is used for the HARQ processes.

Or, for different DL receiving/UL transmitting resources, it is indicated in an RRC signaling or DCI that the first value or the second value is used for HARQ processes used for the DL receiving/UL transmitting resources.

In act S530, a UE determines to use the first value or the second value according to an indication of the act S520. Furthermore, according to a configuration of the act S510, the UE determines a specific value of the first value or the second value used, and sets the first timer to start or not to start.

For example, for different HARQ processes, the first value or the second value is used correspondingly.

Specifically, for example, the UE determines that the first value or the second value is used for a HARQ process where the UE is currently located according to the HARQ process where the UE is currently located and the indication of the act S520. Furthermore, according to the configuration of the act S510, the UE determines a specific value of the first value or the second value used, and sets the first timer to start or not to start.

For another example, the first value or the second value is used for different DL receiving/UL transmitting resources correspondingly.

Specifically, for example, according to a DL receiving/UL transmitting resource where the UE is currently located and the indication of the act S520, the UE determines that the first value or the second value is used for a HARQ used for the DL receiving/UL transmitting resource where the UE is currently located. Furthermore, according to the configuration of the act S510, the UE determines a specific value of the first value or the second value used, and sets the first timer to start or not to start.

A Fourth Implementation

Figure 6:
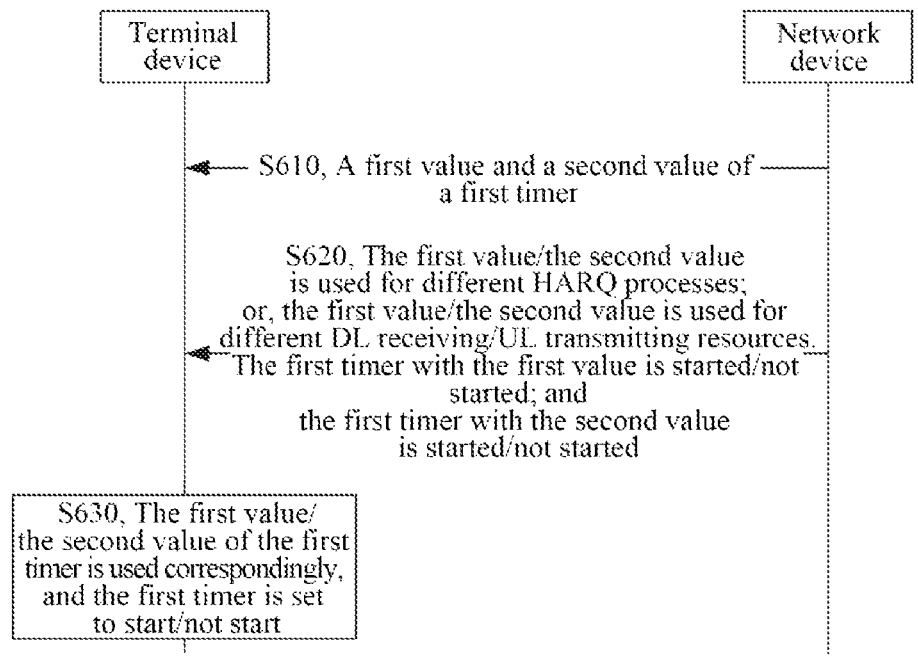
FIG. 6 is a schematic flowchart according to a fourth implementation of the present application.

FIG. 6 is a schematic flowchart according to a fourth implementation of the present application, which includes following acts.

In act S610, a network device configures a first value and a second parameter of a parameter of a first timer.

Optionally, the first timer may be used as a parameter, and the first timer includes one or more of following timers: f) a Discontinuous Reception DownLink HARQ RTT Timer (DRX-HARQ-RTT-TimerDL); g) a Discontinuous Reception UpLink HARQ RTT Timer (DRX-HARQ-RTT-TimerUL); h) a Discontinuous Reception UpLink Retransmission Timer (DRX-RetransmissionTimerUL); i) a Discontinuous Reception DownLink Retransmission Timer (DRX-RetransmissionTimerDL); and j) a Configured Grant Timer.

At the same time, the network configures relevant parameters for HARQ feedback.

For example, for different HARQ processes, feedback-based HARQ transmission or non-feedback-based HARQ transmission is performed; or, feedback-based HARQ transmission or non-feedback-based HARQ transmission is performed for different DL receiving/UL transmitting resources.

In act S620, the network device further indicates that the first value or a second value is used for feedback-based HARQ transmission or non-feedback-based HARQ transmission.

For example, for different HARQ processes, it is indicated in an RRC signaling or a MAC CE that the first value or the second value is used for the HARQ processes.

Or, for different DL receiving/UL transmitting resources, it is indicated in an RRC signaling or DCI that the first value or the second value is used for HARQ processes used for the DL receiving/UL transmitting resources.

Furthermore, the network device may further indicate whether to start the first timer with the first value and/or whether to start the first timer with the second value.

In act S630, a UE determines to use the first value or the second value according to an indication of the act S620. Furthermore, the UE determines a specific value of the first value or the second value used according to a configuration of the act S610, and sets the first timer to start or not to start according to the indication of the act S620.

For example, for different HARQ processes, the first value or the second value is used correspondingly.

Specifically, for example, the UE determines that the first value or the second value is used for a HARQ process where the UE is currently located according to the HARQ process where the UE is currently located and the indication of the act S620. Furthermore, the UE determines a specific value of the first value or the second value used according to the configuration of the act S610, and sets the first timer to start or not to start according to the indication of the act S620.

For another example, the first value or the second value is used for different DL receiving/UL transmitting resources correspondingly.

Specifically, for example, according to a DL receiving/UL transmitting resource where the UE is currently located and the indication of the act S620, the UE determines that the first value or the second value is used for a HARQ process used for the DL receiving/UL transmitting resource where the UE is currently located. Furthermore, the UE determines a specific value of the first value or the second value used according to the configuration of the act S610, and sets the first timer to start or not to start according to the indication of the act S620.

A Fifth Implementation

Figure 7:
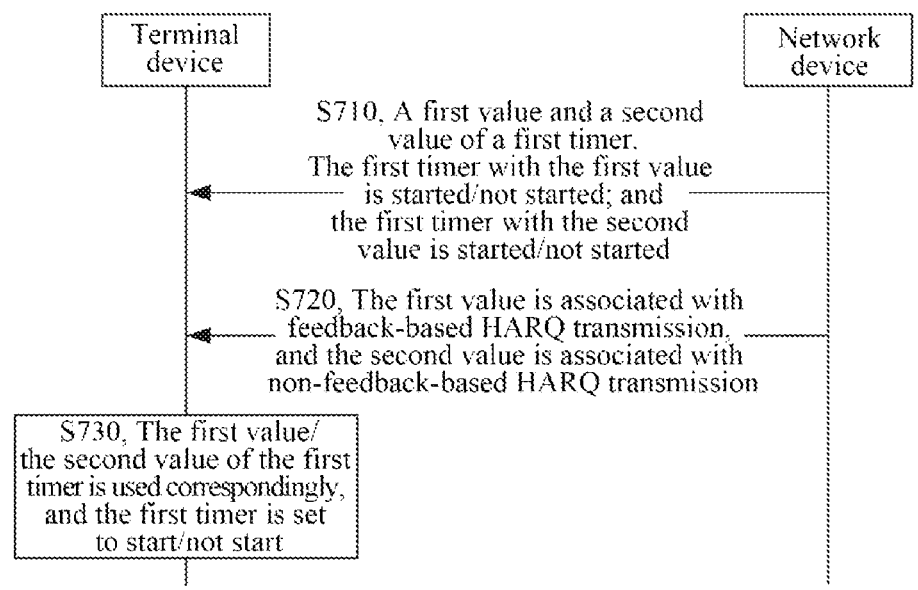
FIG. 7 is a schematic flowchart according to a fifth implementation of the present application.

FIG. 7 is a schematic flowchart according to a fifth implementation of the present application, which includes following acts.

In act S710, a network configures a first value and a second value of a first timer; and configures whether to start the first timer with the first value, and/or whether to start the first timer with the second value.

Optionally, the first timer may be used as a parameter, and the first timer includes one or more of following timers: k) a Discontinuous Reception DownLink HARQ RTT Timer (DRX-HARQ-RTT-TimerDL); l) a Discontinuous Reception UpLink HARQ RTT Timer (DRX-HARQ-RTT-TimerUL); m) a Discontinuous Reception UpLink Retransmission Timer (DRX-RetransmissionTimerUL); n) a Discontinuous Reception DownLink Retransmission Timer (DRX-RetransmissionTimerDL); and o) a Configured Grant Timer.

At the same time, the network configures relevant parameters for HARQ feedback.

For example, for different HARQ processes, feedback-based HARQ transmission or non-feedback-based HARQ transmission is performed; or, feedback-based HARQ transmission or non-feedback-based HARQ transmission is performed for different DL receiving/UL transmitting resources.

In act S720, the network further indicates that the first value or the second value is used for feedback-based HARQ transmission or non-feedback-based HARQ transmission.

For example, it is indicated that the first value is associated with feedback-based HARQ transmission, and it is indicated that the second value is associated with non-feedback-based HARQ transmission.

In act S730, according to a configuration of HARQ feedback and an indication of act S720, a UE determines by itself to use the first value or the second value. Furthermore, according to a configuration of the act S710, the UE determines a specific value of the first value or the second value used, and sets the first timer to start or not to start.

For example, for different HARQ processes, the first value or the second value is used correspondingly.

Specifically, for example, according to a HARQ process where the UE is currently located and the configuration of the act S710, the UE determines that feedback-based HARQ transmission or non-feedback-based HARQ transmission is performed for the HARQ process where the UE is currently located; then, according to the indication of the act S720, the UE determines that the first value or the second value is used for the HARQ process where the UE is currently located. Furthermore, according to the configuration of the act S710, the UE determines a specific value of the first value or the second value used, and sets the first timer to start or not to start.

For another example, the first value or the second value is used for different DL receiving/UL transmitting resources correspondingly.

Specifically, for example, according to a DL receiving/UL transmitting resource where the UE is currently located and the configuration of the act S710, the UE determines that feedback-based HARQ transmission or non-feedback-based HARQ transmission is performed for the DL receiving/UL transmitting resource where the UE is currently located; then, according to the indication of the act S720, the UE determines that the first value or the second value is used for a HARQ process used for the DL receiving/UL transmission resource where the UE is currently located. Furthermore, according to the configuration of the act 5710, the UE determines a specific value of the first value or the second value used, and sets the first timer to start or not to start.

A Sixth Implementation

Figure 8:
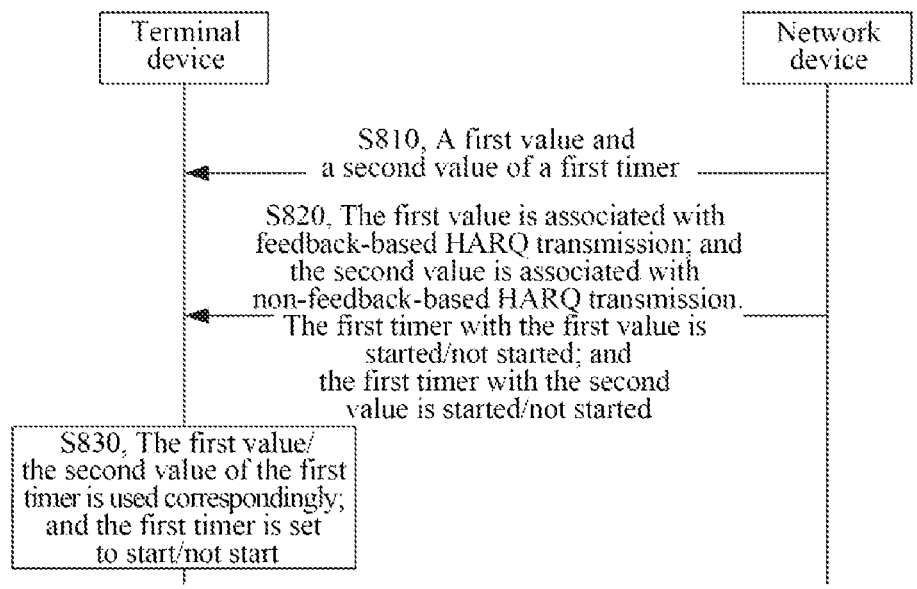
FIG. 8 is a schematic flowchart according to a sixth implementation of the present application.

FIG. 8 is a schematic flowchart according to a sixth implementation of the present application, which includes following acts.

In act S810, a network configures a first value and a second value of a first timer.

Optionally, the first timer may be used as a parameter, and the first timer includes one or more of following timers: p) a Discontinuous Reception DownLink HARQ RTT Timer (DRX-HARQ-RTT-TimerDL); q) a Discontinuous Reception UpLink HARQ RTT Timer (DRX-HARQ-RTT-TimerUL); r) a Discontinuous Reception UpLink Retransmission Timer (DRX-RetransmissionTimerUL); s) a Discontinuous Reception DownLink Retransmission Timer (DRX-RetransmissionTimerDL); and t) a configured grant timer.

At the same time, the network configures relevant parameters for HARQ feedback.

For example, for different HARQ processes, feedback-based HARQ transmission or non-feedback-based HARQ transmission is performed; or, feedback-based HARQ transmission or non-feedback-based HARQ transmission is performed for different DL receiving/UL transmitting resources.

In act S820, the network further indicates that the first value or the second value is used for feedback-based HARQ transmission or non-feedback-based HARQ transmission.

For example, it is indicated that the first value is associated with feedback-based HARQ transmission, and it is indicated that the second value is associated with non-feedback-based HARQ transmission.

Furthermore, a network device may further indicate whether to start the first timer with the first value and/or whether to start the first timer with the second value.

In act S830, according to a configuration of HARQ feedback and an indication of act S820, a UE determines by itself to use the first value or the second value. Furthermore, according to a configuration of the act S810, the UE determines a specific value of the first value or the second value used, and sets the first timer to start or not to start, according to the indication of the act S820.

For example, for different HARQ processes, the first value or the second value is used correspondingly.

Specifically, for example, according to a HARQ process where the UE is currently located and the configuration of the act S810, the UE determines that feedback-based HARQ transmission or non-feedback-based HARQ transmission is performed for the HARQ process where the UE is currently located; then, according to the indication of the act S820, the UE determines that the first value or the second value is used for the HARQ process where the UE is currently located. Furthermore, the UE determines a specific value of the first value or the second value used according to the configuration of the act S810, and sets the first timer to start or not to start according to the indication of the act S820.

For another example, the first value or the second value is used for different DL receiving/UL transmitting resources correspondingly.

Specifically, for example, according to a DL receiving/UL transmitting resource where the UE is currently located and the configuration of the act S810, the UE determines that feedback-based HARQ transmission or non-feedback-based HARQ transmission is performed for the DL receiving/UL transmitting resource where the UE is currently located; then, according to the indication of the act S820, the UE determines that the first value or the second value is used for a HARQ process used for the DL receiving/UL transmission resource where the UE is currently located. Furthermore, the UE determines a specific value of the first value or the second value used according to the configuration of the act S810, and sets the first timer to start or not to start according to the indication of the act S820.

The parameter setting method of the implementation of the present application may be applied to systems with a relatively large transmission delay, e.g. an NTN system. In a communication system with a relatively large transmission delay, such as an NTN system, considering QoS requirements of different services, feedback-based HARQ transmission or non-feedback-based HARQ transmission may be used for different resources respectively, so as to improve effectiveness of resource utilization in a case of feedback and transmission reliability in a case of no feedback. Using the parameter setting method according to the implementation of the present application, a parameter of a first resource may be set to a first value or a second value according to an indication and/or a configuration of a network device, thereby achieving different values of the parameter are associated with different HARQ feedback types.

Figure 9:
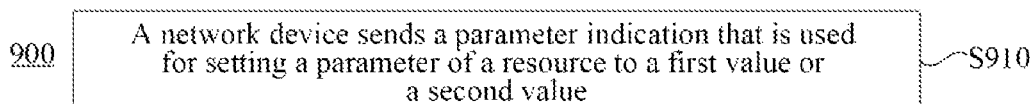
FIG. 9 is a schematic flowchart of a parameter indication method according to an implementation of the present application.

FIG. 9 is a schematic flowchart of a parameter indication method 900 according to an implementation of the present application. The method may optionally be applied to the system shown in FIG. 1, but is not limited thereto. The method includes at least portion of following contents.

In act S910, a network device sends a parameter indication that is used for setting a parameter of a resource to a first value or a second value.

In an implementation of the present application, this resource may refer to a HARQ process, or a DL receiving/UL transmitting resource in a HARQ process. The parameter may include at least one of following: a Modulation MCS table, repetition times of data transmission, and a parameter of a first timer. The first timer may include at least one of following: a Discontinuous Reception DownLink HARQ RTT Timer (DRX-HARQ-RTT-TimerDL); a Discontinuous Reception UpLink HARQ RTT Timer (DRX-HARQ-RTT-TimerUL); a Discontinuous Reception UpLink Retransmission Timer (DRX-RetransmissionTimerUL); a Discontinuous Reception DownLink Retransmission Timer (DRX-RetransmissionTimerDL); and a Configured Grant Timer.

In an implementation, a network device may pre-configure a specific value of the first value and/or the second value of the parameter; furthermore, for different resources, HARQ feedback types used for the resources may be configured.

In an implementation, the above-mentioned HARQ feedback types include feedback-based HARQ transmission and non-feedback-based HARQ transmission.

For example, for different HARQ processes, the HARQ processes are configured to perform feedback-based HARQ transmission or non-feedback-based HARQ transmission.

For another example, for different DL receiving/UL transmitting resources, the DL receiving/UL transmitting resources are configured to perform feedback-based HARQ transmission or non-feedback-based HARQ transmission.

Correspondingly, in the act S910, the network device may transmit the parameter indication to a terminal device to instruct the terminal device to set the parameter of the resource to the first value or the second value, thereby achieving different values of the parameter are associated with different HARQ feedback types.

Specifically, in an implementation of the present application, at least following two modes may be used for parameter indication.

In a first mode, for different resources, the parameter indication indicates parameters of the resources are set to a first value or a second value.

For example, for different HARQ processes, it is indicated that a first value or a second value is used for parameters of the HARQ processes.

Or, for different DL receiving/UL transmitting resources, it is indicated that a first value or a second value is used for parameters of the DL receiving/UL transmitting resources.

In a second mode, for different HARQ feedback types, the parameter indication is also used for indicating that a first HARQ feedback type of a resource is associated with a first value of a parameter, and/or that a second HARQ feedback type of a resource is associated with a second value of a parameter.

For example, it is indicated that feedback-based HARQ transmission is associated with a first value of a first resource, and that non-feedback-based HARQ transmission is associated with a second value of the first resource.

Corresponding to the above-mentioned first mode of parameter indication, a terminal device may directly set a parameter of a resource to a first value or a second value according to the parameter indication, thereby achieving that different values of the parameter are associated with different HARQ feedback types.

Corresponding to the above-mentioned second mode of parameter indication, a terminal device may determine by itself to set a parameter of a resource to a first value or a second value according to a preliminary configuration and the parameter indication, thereby achieving that different values of the parameter are associated with different HARQ feedback types.

The network device may further configure HARQ feedback types of different resources.

When the parameter is a parameter of the first timer, the parameter indication may be further used for indicating whether to start the first timer with the first value and/or whether to start the first timer with the second value. Or, the network device of the implementation of the present application may further pre-configure whether to start the first timer with the first value and/or whether to start the first timer with the second value.

Correspondingly, the terminal device may set the first timer with the first value to start or not start, and/or set the first timer with the second value to start or not start according to an indication or a configuration of the network device.

In an implementation, a default state of the first timer is set to a starting state. Correspondingly, when a starting condition of the first timer is indicated, if the first timer needs to be started, no explicit indication is needed; if the first timer needs not to be started, an explicit indication may be performed in the parameter indication.

Optionally, the above-mentioned parameter indication is used for setting a parameter of a HARQ process to a first value or a second value.

Optionally, the above-mentioned parameter indication is further used for indicating that a parameter of a HARQ process of a feedback-based HARQ transmission type is set to a first value, and/or a parameter of a HARQ process of a non-feedback-based HARQ transmission type is set to a second value.

Optionally, the above-mentioned parameter indication is used for setting a parameter of a DL receiving/UL transmitting resource in a HARQ process to a first value or a second value.

Optionally, the above-mentioned parameter indication is further used for indicating that a parameter of a DL receiving/UL transmitting resource of a feedback-based HARQ transmission type is set to a first value, and/or a parameter of a DL receiving/UL transmitting resource of a non-feedback-based HARQ transmission type is set to a second value.

Optionally, the above-mentioned parameter indication is further used for indicating that a parameter of a first timer of a HARQ process used for a DL receiving/UL transmitting resource of a feedback-based HARQ transmission type is set to a first value, and/or a parameter of a first timer of a HARQ process used for a DL receiving/UL transmitting resource of a non-feedback-based HARQ transmission type is set to a second value.

Optionally, the parameter indication is transmitted in an RRC signaling, a MAC CE, or DCI.

Specific examples of the method 900 performed by the network device in the implementation may be referred to related descriptions about the network device in the first to sixth implementations of the method 200, which will not be repeated here for brevity.

The parameter indication method of the implementation of the present application may be applied to systems with a relatively large transmission delay, e.g. an NTN system. For a communication system with a relatively large transmission delay, such as an NTN system, considering QoS requirements of different services, feedback-based HARQ transmission or non-feedback-based HARQ transmission may be used for different resources respectively. Using the parameter indication method according to the implementation of the present application, a terminal device may be instructed and/or configured to set a parameter of a first resource to a first value or a second value, thereby achieving that different values of the parameter are associated with different HARQ feedback types.

Figure 10:
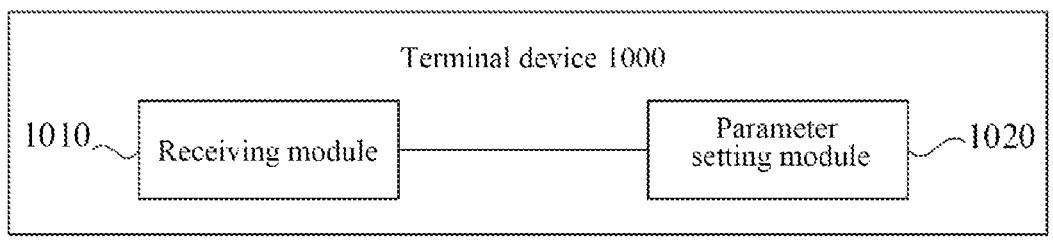
FIG. 10 is a first schematic block diagram of a terminal device according to an implementation of the present application.

FIG. 10 is a schematic block diagram of a terminal device 1000 according to an implementation of the present application. The terminal device includes a receiving 1010 and a parameter setting module 1020.

The receiving module 1010 is configured to receive a parameter indication that is used for setting a parameter of a resource to a first value or a second value.

The parameter setting module 1020 is configured to set a parameter of a first resource to the first value or the second value according to the parameter indication; wherein the first resource is a resource in the parameter indication.

Optionally, the parameter indication is also used for indicating that a first HARQ feedback type of a resource is associated with a first value of a parameter, and/or that a second HARQ feedback type of a resource is associated with a second value of a parameter.

Figure 11:
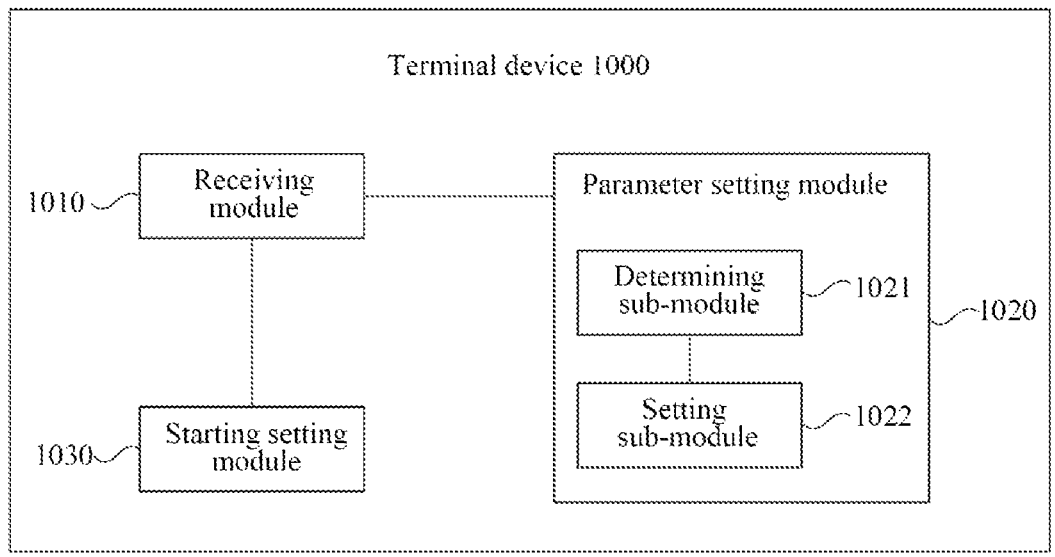
FIG. 11 is a second schematic block diagram of a terminal device according to an implementation of the present application.

Optionally, in an implementation of the present application, as shown in FIG. 11, the parameter setting module 1020 may include a determining sub-module 1021 and a setting sub-module 1022.

The determining sub-module 1021 is configured to determine a HARQ feedback type of the first resource according to an identity of the first resource.

The setting sub-module 1022 is configured to set the parameter of the first resource to the first value or the second value according to the HARQ feedback type of the first resource and the parameter indication.

Optionally, the HARQ feedback type includes feedback-based HARQ transmission and non-feedback-based HARQ transmission.

Optionally, the parameter includes at least one of following: an MCS table, repetition times of data transmission, and a parameter of a first timer.

In an implementation of the present application, the first timer includes at least one of following: a Discontinuous Reception DownLink HARQ RTT Timer (DRX-HARQ-RTT-TimerDL); a Discontinuous Reception UpLink HARQ RTT Timer (DRX-HARQ-RTT-TimerUL); a Discontinuous Reception UpLink Retransmission Timer (DRX-RetransmissionTimerUL); a Discontinuous Reception DownLink Retransmission Timer (DRX-RetransmissionTimerDL); and a Configured Grant Timer.

Optionally, the parameter setting module 1020 is configured to set a first timer of a HARQ process used for the first resource to the first value or the second value when the first resource is a resource in the HARQ process.

Optionally, the parameter indication is also used for indicating whether to start the first timer with the first value and/or whether to start the first timer with the second value.

Optionally, in an implementation of the present application, as shown in FIG. 11, the terminal device 1000 may further include a starting setting module 1030.

The starting setting module 1030 is configured to set a starting condition of a first timer of the resource according to the parameter indication.

Optionally, the resource includes a HARQ process.

Or, the resource includes a DL receiving/UL transmitting resource in a HARQ process.

Optionally, the above-mentioned parameter indication is further used for indicating that a parameter of a HARQ process of a feedback-based HARQ transmission type is set to a first value, and/or a parameter of a HARQ process of a non-feedback-based HARQ transmission type is set to a second value.

Optionally, the parameter setting module 1020 is configured to determine a HARQ feedback type of a HARQ process according to an identity of the HARQ process; and set a parameter of the HARQ process to a first value in a case that it is determined that the HARQ process is a HARQ process of a feedback-based HARQ transmission type, or set a parameter of the HARQ process to a second value in a case that it is determined that the HARQ process is a HARQ process of a non-feedback-based HARQ transmission type.

Optionally, the above-mentioned parameter indication is used for setting a parameter of a DL receiving/UL transmitting resource in a HARQ process to a first value or a second value.

Optionally, the above-mentioned parameter indication is further used for indicating that a parameter of a DL receiving/UL transmitting resource of a feedback-based HARQ transmission type is set to a first value, and/or a parameter of a DL receiving/UL transmitting resource of a non-feedback-based HARQ transmission type is set to a second value.

Optionally, the parameter setting module 1020 is configured to determine a HARQ feedback type of a DL receiving/UL transmitting resource according to an identity of the DL receiving/UL transmitting resource; and set a parameter of the DL receiving/UL transmitting resource to a first value in a case that it is determined that the DL receiving/UL transmitting resource is a DL receiving/UL transmitting resource of a feedback-based HARQ transmission type, or set a parameter of the DL receiving/UL transmitting resource to a second value in a case that it is determined that the DL receiving/UL transmitting resource is a DL receiving/UL transmitting resource of a non-feedback-based HARQ transmission type.

Optionally, the above-mentioned parameter indication is further used for indicating that a parameter of a first timer of a HARQ process used for a DL receiving/UL transmitting resource of a feedback-based HARQ transmission type is set to a first value, and/or a parameter of a first timer of a HARQ process used for a DL receiving/UL transmitting resource of a non-feedback-based HARQ transmission type is set to a second value.

Optionally, the parameter setting module 1020 is configured to determine a HARQ feedback type of a DL receiving/UL transmitting resource according to an identity of the DL receiving/UL transmitting resource; and set a parameter of a first timer of a HARQ process used for the DL receiving/UL transmitting resource to a first value in a case that it is determined that the DL receiving/UL transmitting resource is a DL receiving/UL transmitting resource of a feedback-based HARQ transmission type, or set a parameter of a first timer of a HARQ process used for the DL receiving/UL transmitting resource to a second value in a case that it is determined that the DL receiving/UL transmitting resource is a DL receiving/UL transmitting resource of a non-feedback-based HARQ transmission type.

Optionally, the parameter indication is transmitted in an RRC signaling, a MAC CE, or DCI.

It should be understood that the above-mentioned and other operations and/or functions of various modules in the terminal device of the implementation of the present application are respectively in order to implement corresponding processes of the terminal device in the method 200 in FIG. 2, which will not be repeated here for brevity.

Figure 12:
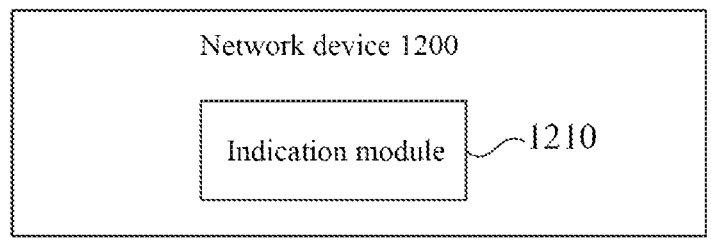
FIG. 12 is a schematic block diagram of a network device according to an implementation of the present application.

FIG. 12 is a schematic block diagram of a network device 1200 according to an implementation of the present application. The network device may include an indication module 1210.

The indication module 1210 is configured to send a parameter indication that is used for setting a parameter of a resource to a first value or a second value.

Optionally, the parameter indication is also used for indicating that a first HARQ feedback type of the resource is associated with the first value of the parameter, and/or a second HARQ feedback type of the resource is associated with the second value of the parameter.

Optionally, the HARQ feedback type includes feedback-based HARQ transmission and non-feedback-based HARQ transmission.

Optionally, the parameter includes at least one of following: an MCS table, repetition times of data transmission, and a parameter of a first timer.

In an implementation of the present application, the first timer includes at least one of following: a Discontinuous Reception DownLink HARQ RTT Timer (DRX-HARQ-RTT-TimerDL); a Discontinuous Reception UpLink HARQ RTT Timer (DRX-HARQ-RTT-TimerUL); a Discontinuous Reception UpLink Retransmission Timer (DRX-RetransmissionTimerUL); a Discontinuous Reception DownLink Retransmission Timer (DRX-RetransmissionTimerDL); and a Configured Grant Timer.

Optionally, the parameter indication is also used for indicating whether to start the first timer with the first value and/or whether to start the first timer with the second value.

Optionally, the resource includes a HARQ process.

Or, the resource includes a DL receiving/UL transmitting resource in a HARQ process.

Optionally, the above-mentioned parameter indication is used for setting a parameter of a HARQ process to the first value or the second value.

Optionally, the above-mentioned parameter indication is further used for indicating that a parameter of a HARQ process of a feedback-based HARQ transmission type is set to the first value, and/or a parameter of a HARQ process of a non-feedback-based HARQ transmission type is set to the second value.

Optionally, the above-mentioned parameter indication is used for setting a parameter of a DL receiving/UL transmitting resource in a HARQ process to the first value or the second value.

Optionally, the above-mentioned parameter indication is further used for indicating that a parameter of a DL receiving/UL transmitting resource of a feedback-based HARQ transmission type is set to the first value, and/or a parameter of a DL receiving/UL transmitting resource of a non-feedback-based HARQ transmission type is set to the second value.

Optionally, the above-mentioned parameter indication is further used for indicating that a parameter of a first timer of a HARQ process used for a DL receiving/UL transmitting resource of a feedback-based HARQ transmission type is set to the first value, and/or a parameter of a first timer of a HARQ process used for a DL receiving/UL transmitting resource of a non-feedback-based HARQ transmission type is set to the second value.

Optionally, the parameter indication is transmitted in an RRC signaling, a MAC CE, or DCI.

It should be understood that the above-mentioned and other operations and/or functions of various modules in the network device of the implementation of the present application are respectively to achieve corresponding processes of the network device in the method 900 of FIG. 9, which will not be repeated here for brevity.

Figure 13:
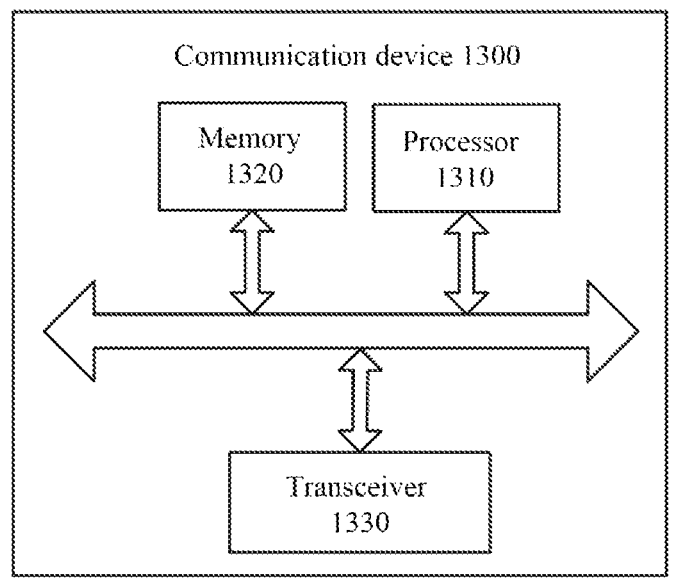
FIG. 13 is a schematic block diagram of a communication device according to an implementation of the present application.

FIG. 13 is a schematic block diagram of a communication device 1300 according to an implementation of the present application. The communication device 1300 shown in FIG. 13 includes a processor 1310, which may call and run a computer program from a memory to implement the methods in the implementations of the present application.

Optionally, as shown in FIG. 13, the communication device 1300 may further include a memory 1320. The processor 1310 may call and run a computer program from the memory 1320 to implement the methods in the implementations of the present application.

The memory 1320 may be a separate device independent of the processor 1310, or may be integrated in the processor 1310.

Optionally, as shown in FIG. 13, the communication device 1300 may further include a transceiver 1330, and the processor 1310 may control the transceiver 1330 to communicate with another device. Specifically, the transceiver 1330 may send information or data to another device or receive information or data sent by another device.

The transceiver 1330 may include a transmitter and a receiver. The transceiver 1330 may further include antennas, a quantity of which may be one or more.

Optionally, the communication device 1300 may specifically be the network device of the implementations of the present application, and the communication device 1300 may implement corresponding processes implemented by the network device in various methods of the implementations of the present application, which will not be repeated here for brevity.

Optionally, the communication device 1300 may be the terminal device of the implementations of the present application, and the communication device 1300 may implement corresponding processes implemented by the terminal device in various methods of the implementations of the present application, which will not be repeated here again for brevity.

Figure 14:
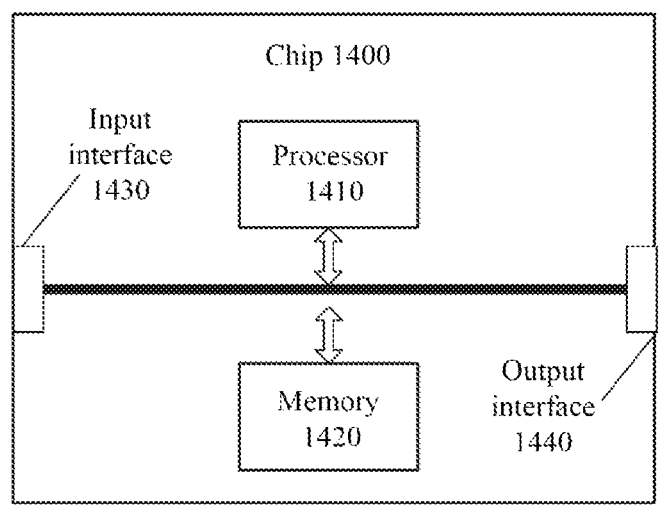
FIG. 14 is a schematic block diagram of a chip according to an implementation of the present application.

FIG. 14 is a schematic block diagram of a chip according to an implementation of the present application. The chip 1400 shown in FIG. 14 includes a processor 1410, wherein the processor 1410 may call and run a computer program from a memory to implement the methods in the implementations of the present application.

Optionally, as shown in FIG. 14, the chip 1400 may further include a memory 1420. The processor 1410 may call and run a computer program from the memory 1420 to implement the methods in the implementations of the present application.

The memory 1420 may be a separate device independent of the processor 1410, or may be integrated in the processor 1410.

Optionally, the chip 1400 may further include an input interface 1430. The processor 1410 may control the input interface 1430 to communicate with another device or chip. Specifically, the processor 1410 may acquire information or data sent by another device or chip.

Optionally, the chip 1400 may further include an output interface 1440. The processor 1410 may control the output interface 1440 to communicate with another device or chip. Specifically, the processor 1410 may output information or data to another device or chip.

Optionally, the chip may be applied to the terminal device in the implementations of the present application, and the chip may implement the corresponding processes implemented by the terminal device in various methods of the implementations of the present application, which will not be repeated here for brevity.

Optionally, the chip may be applied to the network device in the implementations of the present application, and the chip may implement the corresponding processes implemented by the network device in the various methods of the implementations of the present application, which will not be repeated here for brevity.

It should be understood that the chip mentioned in the implementations of the present application may also be referred to as a system-level chip, a system chip, a chip system, or a system on chip, etc.

The above-mentioned processor may be a general purpose processor, a Digital Signal Processor (DSP), a Field Programmable Gate Array (FPGA), an Application Specific Integrated Circuit (ASIC) or another programmable logic device, a transistor logic device, or a discrete hardware component, etc. The above-mentioned general-purpose processor may be a microprocessor or any conventional processor, etc.

The above-mentioned memory may be a volatile memory or non-volatile memory, or may include both volatile and non-volatile memories. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM).

It should be understood that, the foregoing memories are examples for illustration and should not be construed as limitations. For example, the memory in the implementations of the present application may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), and a Direct Rambus RAM (DR RAM), etc. That is to say, the memories in the implementations of the present application are intended to include, but are not limited to, these and any other suitable types of memories.

Figure 15:
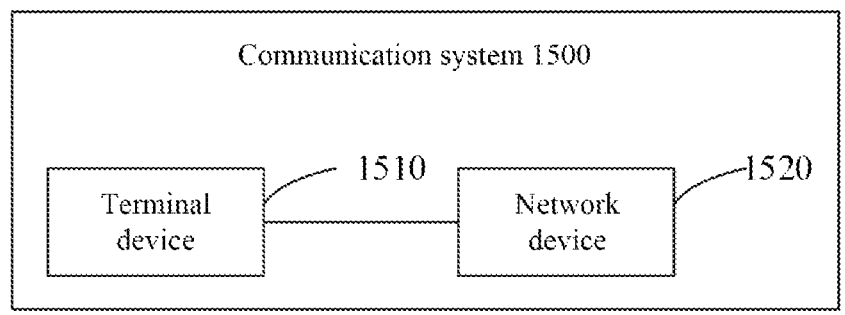
FIG. 15 is a schematic block diagram of a communication system according to an implementation of the present application.

FIG. 15 is a schematic block diagram of a communication system 1500 according to an implementation of the present application. As shown in FIG. 15, the communication system 1500 includes a terminal device 1510 and a network device 1520.

The terminal device 1510 is configured to receive a parameter indication that is used for setting a parameter of a resource to a first value or a second value; the terminal device 1510 is further configured to set a parameter of a first resource to the first value or the second value according to the parameter indication.

The network device 1520 is configured to send the parameter indication that is used for setting the parameter of the resource to the first value or the second value.

The terminal device 1510 may be configured to implement corresponding functions implemented by the terminal device in the method 200, and composition of the terminal device 1510 may be as shown in the terminal device 1000 in the above-mentioned implementation. The network device 1520 may be configured to implement corresponding functions implemented by the network device in the method 900, and composition of the network device 1520 may be as shown in the network device 1200 in the above-mentioned implementation. Details will not be repeated here for brevity.

The above-mentioned implementations may be implemented in whole or in part through software, hardware, firmware, or any combination thereof. When implemented through software, they may be implemented in whole or in part in a form of a computer program product. The computer program product includes one or more computer instructions. When the computer program instructions are loaded and executed on a computer, processes or functions described in the implementations of the present application are generated in whole or in part. The computer may be a general purpose computer, a special purpose computer, a computer network, or another programmable apparatus. The computer instructions may be stored in a computer-readable storage medium, or transmitted from one computer-readable storage medium to another computer-readable storage medium, for example, the computer instructions may be transmitted from a website site, a computer, a server, or a data center to another website site, computer, server, or data center through a wired mode (e.g., a coaxial cable, an optical fiber, and a Digital Subscriber Line (DSL)) or a wireless mode (e.g., infrared radiation, radio, and microwave). The computer-readable storage medium may be any available medium that can be accessed by a computer or a data storage device such as a server, a data center, or the like that integrates one or more available media. The available media may be magnetic media (e.g., floppy disks, hard disks, magnetic tapes), optical media (e.g., Digital Versatile Disks (DVDs)), or semiconductor media (e.g., Solid State Disks (SSDs)), or the like.

It should be understood that in various implementations of the present application, sequence numbers of the various processes do not imply an order of execution of the various processes, which should be determined by their functions and internal logics, but should not constitute any limitation on implementation processes of the implementations of the present application.

Those skilled in the art may clearly understand that for convenience and conciseness of description, specific working processes of the systems, apparatuses, and units described above may refer to corresponding processes in the aforementioned method implementations, which will not be repeated here.

The above are merely specific implementations of the present application, but the protection scope of the present application is not limited thereto. Any person skilled in the art may readily conceive variations or substitutions within the technical scope disclosed by the present application, which should be included within the protection scope of the present application. Therefore, the protection scope of the present application shall be subject to the protection scope of the claims.

What is claimed is:

1. A parameter setting method, comprising:
  receiving, by a terminal device, a parameter indication that is used for setting a parameter of a resource to a first value or a second value; and
  setting, by the terminal device, a parameter of a first resource to the first value or the second value according to the parameter indication; wherein the first resource is a resource in the parameter indication; wherein the parameter indication is further used for indicating at least one of a first Hybrid Automatic Repeat reQuest (HARQ) feedback type of the resource being associated with the first value of the parameter, a second HARQ feedback type of the resource being associated with the second value of the parameter; wherein the first HARQ feedback type is a feedback-based HARQ transmission type and the second HARQ feedback type is a non-feedback-based HARQ transmission type;
  wherein the parameter comprises a parameter of a first timer, wherein the parameter indication is further used for indicating at least one of whether to start the first timer with the first value or whether to start the first timer with the second value, and the first timer comprises a Configured Grant Timer.

2. The method according to claim 1, wherein the setting, by the terminal device, the parameter of the first resource to the first value or the second value according to the parameter indication, comprises:
  determining, by the terminal device, a HARQ feedback type of the first resource according to an identity of the first resource; and
  setting, by the terminal device, the parameter of the first resource to the first value or the second value according to the HARQ feedback type of the first resource and the parameter indication.

3. The method according to claim 1, wherein the HARQ feedback type comprises feedback-based HARQ transmission and non-feedback-based HARQ transmission.

4. The method according to claim 1, wherein the first timer comprises further at least one of following: a Discontinuous Reception DownLink Hybrid Automatic Repeat reQuest (HARQ) Round Trip Time (RTT) Timer, a Discontinuous Reception UpLink HARQ RTT Timer, a Discontinuous Reception UpLink Retransmission Timer, and a Discontinuous Reception DownLink Retransmission Timer.

5. The method according to claim 1, wherein the setting the parameter of the first resource to the first value or the second value, comprises:

setting a first timer of a HARQ process used for the first resource to the first value or the second value in a case that the first resource is a resource in the HARQ process.

6. The method according to claim 1, wherein the resource comprises at least one of a Hybrid Automatic Repeat reQuest (HARQ) process and a downlink receiving/uplink transmitting resource in the HARQ process.

7. The method according to claim 6, wherein the parameter indication is used for setting a parameter of the HARQ process to the first value or the second value.

8. The method according to claim 7, wherein the parameter indication is further used for indicating at least one of a parameter of a HARQ process of a feedback-based HARQ transmission type being set to the first value, a parameter of a HARQ process of a non-feedback-based HARQ transmission type being set to the second value.

9. The method according to claim 6, wherein the parameter indication is used for setting a parameter of the downlink receiving/uplink transmitting resource in the HARQ process to the first value or the second value.

10. The method according to claim 9, wherein the parameter indication is further used for indicating at least one of a parameter of a downlink receiving/uplink transmitting resource of a feedback-based HARQ transmission type being set to the first value, a parameter of a downlink receiving/uplink transmitting resource of a non-feedback-based HARQ transmission type being set to the second value.

11. The method according to claim 10, wherein the setting, by the terminal device, the parameter of the first resource to the first value or the second value according to the parameter indication, comprises:
  determining, by the terminal device, a HARQ feedback type of a downlink receiving/uplink transmitting resource according to an identity of the downlink receiving/uplink transmitting resource; and,
  setting a parameter of the downlink receiving/uplink transmitting resource to the first value in a case that it is determined that the downlink receiving/uplink transmitting resource is a downlink receiving/uplink transmitting resource of a feedback-based HARQ transmission type; or,
  setting a parameter of the downlink receiving/uplink transmitting resource to the second value in a case that it is determined that the downlink receiving/uplink transmitting resource is a downlink receiving/uplink transmitting resource of a non-feedback-based HARQ transmission type.

12. The method according to claim 9, wherein parameter indication is further used for indicating at least one of a parameter of a first timer of a HARQ process used for a downlink receiving/uplink transmitting resource of a feedback-based HARQ transmission type being set to the first value, a parameter of a first timer of a HARQ process used for a downlink receiving/uplink transmitting resource of a non-feedback-based HARQ transmission type being set to the second value.

13. The method according to claim 12, wherein the setting, by the terminal device, the parameter of the first resource to the first value or the second value according to the parameter indication, comprises:
  determining, by the terminal device, a HARQ feedback type of a downlink receiving/uplink transmitting resource according to an identity of the downlink receiving/uplink transmitting resource; and,
  setting a parameter of a first timer of a HARQ process used for the downlink receiving/uplink transmitting resource to the first value in a case that it is determined that the downlink receiving/uplink transmitting resource is a downlink receiving/uplink transmitting resource of a feedback-based HARQ transmission type; or,
  setting a parameter of a first timer of a HARQ process used for the downlink receiving/uplink transmitting resource to the second value in a case that it is determined that the downlink receiving/uplink transmitting resource is a downlink receiving/uplink transmitting resource of a non-feedback-based HARQ transmission type.

14. The method according to claim 1, wherein the parameter indication is transmitted in a Radio Resource Control (RRC) signaling, a Medium Access Control (MAC) Control Element (CE), or Downlink Control Information (DCI).

15. A terminal device, comprising: a processor and a memory, wherein the memory is configured to store a computer program; and the processor is configured to invoke and run the computer program from the memory to perform the method according to claim 1.

16. A parameter indication method, comprising:
  sending, by a network device, a parameter indication that is used for setting a parameter of a resource to a first value or a second value; wherein the resource in the parameter indication comprises a first resource, a parameter of which is set by a terminal device to the first value or the second value according to the parameter indication;
  wherein the parameter indication is further used for indicating at least one of a first Hybrid Automatic Repeat reQuest (HARQ) feedback type of the resource being associated with the first value of the parameter, a second HARQ feedback type of the resource being associated with the second value of the parameter, wherein the first HARQ feedback type is a feedback-based HARQ transmission type and the second HARQ feedback type is a non-feedback-based HARQ transmission type,
  wherein the parameter comprises a parameter of a first timer, wherein the parameter indication is further used for indicating at least one of whether to start the first timer with the first value or whether to start the first timer with the second value, and the first timer comprises a Configured Grant Timer.

17. A network device, comprising: a processor and a memory, wherein the memory is configured to store a computer program; and the processor is configured to invoke and run the computer program from the memory to perform the method according to claim 16.

* * * * *